Jan. 21, 1936.  J. B. DORMER  2,028,442
LOAD HANDLING DEVICE
Filed Aug. 11, 1933   4 Sheets-Sheet 2
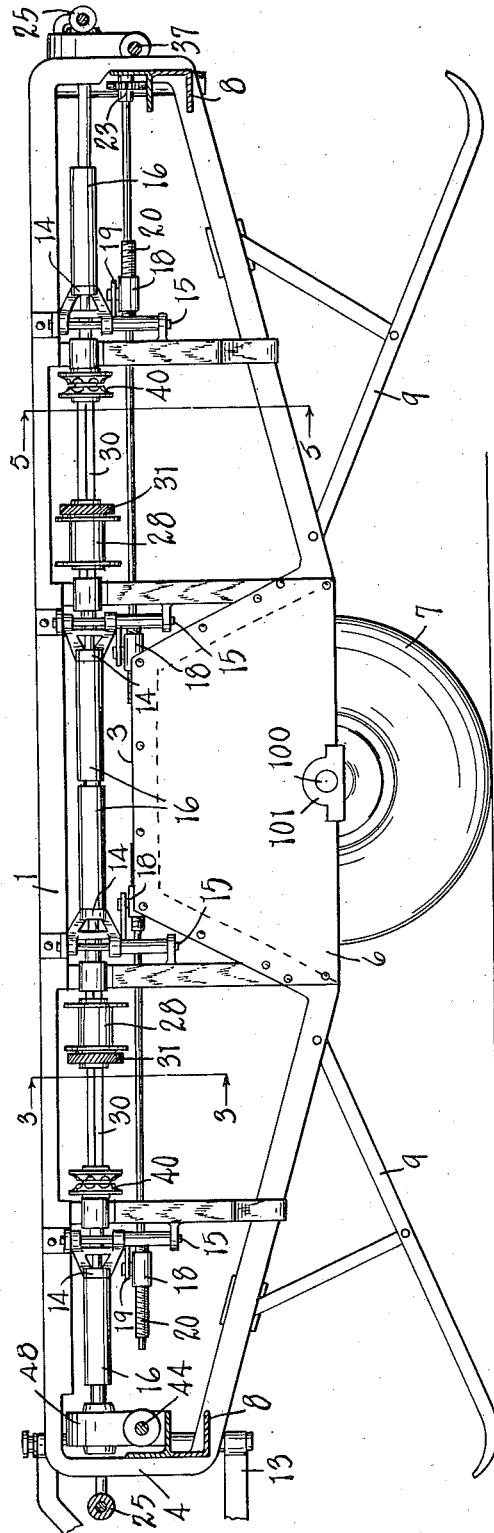
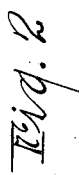
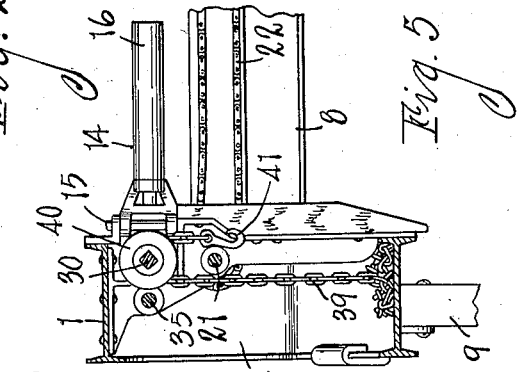
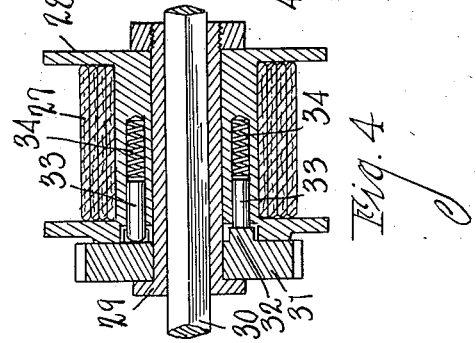
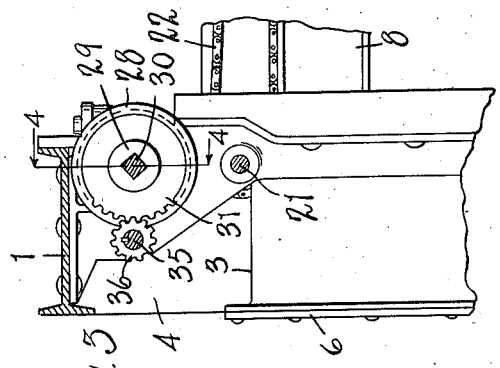
INVENTOR
Jay B. Dormer
BY
Chappell & Earl
ATTORNEYS

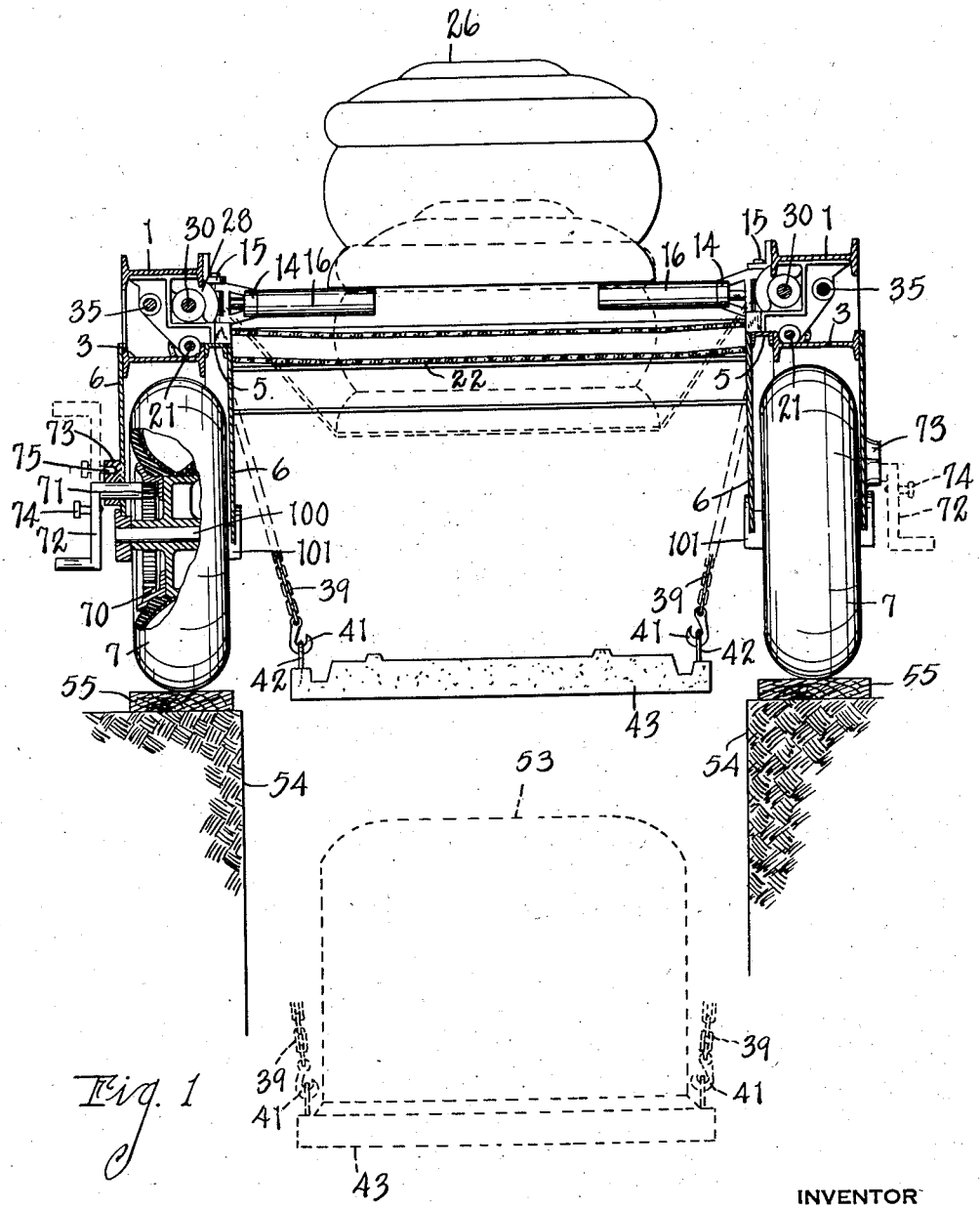

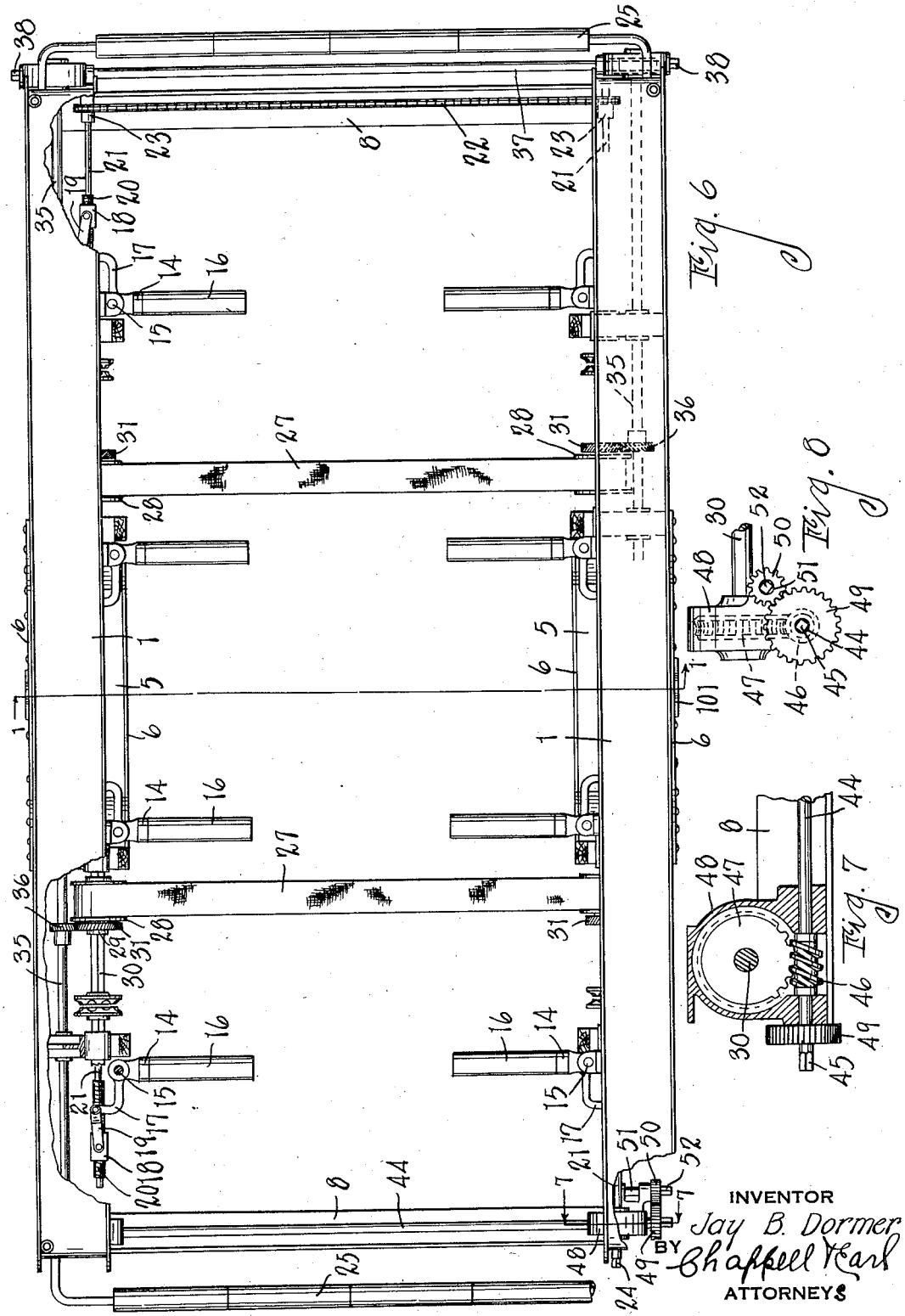

Jan. 21, 1936.  J. B. DORMER  2,028,442
LOAD HANDLING DEVICE
Filed Aug. 11, 1933  4 Sheets-Sheet 4

INVENTOR
Jay B. Dormer
BY
Chappell Earl
ATTORNEYS

Patented Jan. 21, 1936

2,028,442

UNITED STATES PATENT OFFICE 2,028,442

LOAD HANDLING DEVICE

Jay B. Dormer, St. Joseph, Mich.

Application August 11, 1933, Serial No. 684,667

12 Claims. (Cl. 27—32)

The main objects of this invention are:

First, to provide a device adapted to be mounted on a truck or vehicle which is especially well adapted for the handling of vaults and caskets although well adapted for use in handling other material, particularly heavy loads.

Second, to provide a structure capable of raising or lowering the load and having collapsible supports for the load.

Third, to provide a device of this character having individual and independent means for handling heavy loads such as vaults and lighter loads such as caskets.

Fourth, to provide improved means for adjusting the hanger strap reels to quickly shorten or lengthen the straps or to level the load on the straps.

Fifth, to provide a device having the above features and advantages which is very convenient to use, requiring relatively little labor or effort on the part of the operator and which enables a single workman to perform work commonly requiring two or more workmen and rather complicated apparatus.

Objects relating to details and economies of my invention will appear from the description to follow. The invention is defined and pointed out in the claims.

A structure which is a preferred embodiment of my invention is illustrated in the accompanying drawings, in which:

Fig. 1 is a view in transverse vertical section on line 1—1 of Fig. 6 of a vehicle carrying the device embodying the features of my invention, the device being shown in operation as a burial apparatus.

Fig. 2 is a vertical longitudinal section.

Fig. 3 is an enlarged fragmentary section on a line corresponding to line 3—3 of Fig. 2.

Fig. 4 is an enlarged fragmentary section on a line corresponding to line 4—4 of Fig. 3.

Fig. 5 is an enlarged fragmentary section on a line corresponding to line 5—5 of Fig. 2.

Fig. 6 is a top plan view, parts of the frame being broken away.

Fig. 7 is an enlarged fragmentary detail section on a line corresponding to line 7—7 of Fig. 6.

Fig. 8 is an enlarged fragmentary detail in side elevation of the chain sheave control.

Figure 9:
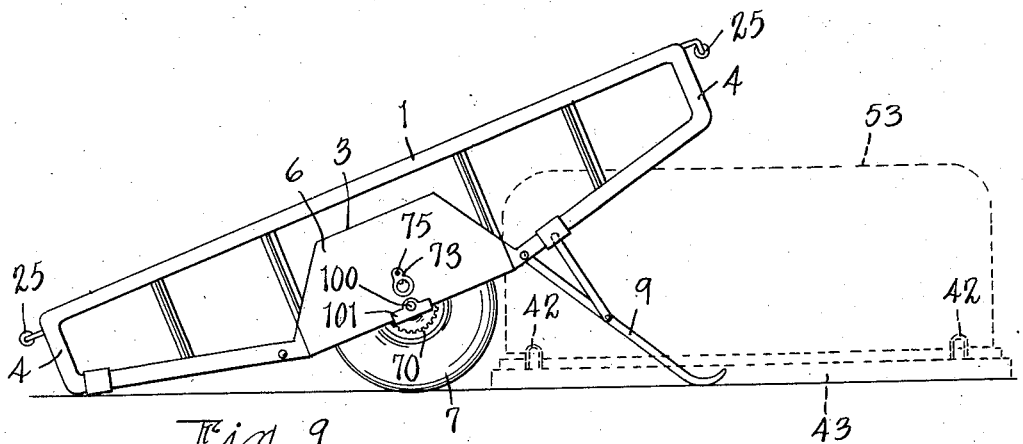
Fig. 9 is a view in side elevation of the vehicle in tilted position to clear the top of the load.

The embodiment of my invention illustrated in the accompanying drawings is especially designed by me for the handling of burial vaults and caskets, particularly the handling and transportation of the burial vaults and the lowering of caskets.

The open or rectangular frame is, in this embodiment, made up of side members and connecting end members, these frame members constituting supports and a housing for the mechanism.

The frame side members are, in this embodiment, built up of angle iron of I-beam cross section, the top members 1 being substantially straight, the bottom members 2 having central arches 3 providing wheel housings and having upwardly inclined portions at each side of these arches 3 connected to the top members by end uprights 4. In this embodiment, the frame parts are welded together and I have not attempted to illustrate the joints.

Side plates 6 are secured to the arched portion of the bottom sills, completing the housings for the carrying wheels 7. Horizontal bars 5 are secured to the inner side of the tops of the arch portion 3 in order to widen the wheel housings. These side plates carry bearings for the wheels as will be hereinafter pointed out. The side members are connected by the end cross pieces 8 making thereby an open frame capable of sustaining and carrying very heavy loads without wracking. The wheels 7 are positioned centrally so that the frame may be tilted on the axles allowing the end of the frame to clear a load, such as for example, a burial vault, and proper positioning of the frame for the elevation of the load to carrying position.

The wheel axles 100 are carried by bearings 101 on the wheel housing side walls and each wheel is provided with an internal or ring gear 70 with which the pinion 71 on the hand crank 72 coacts. Manual means are provided for manipulating the truck into accurate position for loading or, for example, lowering a vault into a grave. This means comprises a crank 72 adapted to be introduced into the bearing 73 carried by the outer wheel housing plates 6.

With this arrangement, the wheels can be individually manipulated to accurately position the truck relative to a grave or as may be desired. This adjusting means also serves as a locking means, the cranks being provided with detents 74 which coact with holes or keepers 75 in the bearing plate 13. With these locking pins or detents in engagement with their sockets, the wheels are locked in their adjusted positions. With this locking means, the truck may be very accurately positioned manually and with relatively little effort.

The truck is provided with a coupling member designated generally by the numeral 13 and adapted to be attached to either end of the frame so that the truck may be easily positioned relative to a grave, for example, and withdrawn without the necessity for turning. The coupling is not described in detail but it will be understood that it should be such as to support the truck from the propelling vehicle.

To facilitate loading and positioning the load, I provide a plurality of swinging load supports 14 which are pivoted at 15 in oppositely opposed pairs to be swung to load supporting position transversely of the frame, as shown in Figs. 1 and 6, or collapsed into parallel relation with the frame as shown in Fig. 2. These load supports are provided with rollers 16 which reduce the friction, not only facilitating sliding movement of the load on the truck but also facilitating the retracting or collapsing movement of the supports from under the load.

The load supports are provided with crank arms 17 connected to the nuts 18 by the links 19 (see Fig. 6). These nuts coact with the screws or worms 20 on the shafts 21 disposed longitudinally of the side members of the frame. The shafts are connected at their ends by means of the sprocket chain 22 engaging sprockets 23 at one end of the shaft. One of the shafts is provided with a non-circular portion 24 at one end adapted to receive a crank so that by means of the crank, all of the supports may be simultaneously projected or retracted.

Adjacent worms or screws are preferably right and left hand threaded so that the adjacent supports swing in opposite directions, thus minimizing a tendency for shifting the load when the supports are withdrawn therefrom.

At the ends of the frame are load carrying rollers 25 which facilitate unloading to or from a platform or from the ground when the frame is not swung over the load as illustrated, for example, in Fig. 9.

The loading straps 27 are provided for receiving the load when the supports are retracted, for example, a casket such as conventionally shown at 26 (Fig. 1). These straps or belts are carried by sheaves or reels 28 disposed in opposed pairs at the sides of the frame. The ends of the straps are preferably detachably connected with these reels, and the reels are preferably mounted to permit a ratchet adjustment of the reels for quickly positioning or equalizing the straps. To accomplish this, the reels are journaled to sleeves 29 splined to the supporting shafts 30 which, in the embodiment illustrated, are square, this arrangement permitting the longitudinal adjustment of the reels on the shaft to accommodate loads of different lengths.

Gear wheels 31 are journaled to the sleeves 29 and provided with ratchet teeth coacting with the spring pressed pawls 33 on the reels, the spring being illustrated at 34 (see Fig. 4). Thus arranged, the gear drives the reel through the pawls, but the arrangement permits the free rotation of the reel to shorten or take up the straps. The reels are not driven by the shafts 30 but are driven through the driving shafts 35 disposed in parallel relation to these supporting shafts or rods 30 and having pinions 36 thereon meshing with the gears 31, thus providing a reducing speed drive and correspondingly increasing the power.

The shafts 35 are connected at one end of the frame by the cross or jack shaft 37 which terminates in square portions 38 adapted to receive a crank for manipulating the reels. If desired, a suitable braking means may be provided for controlling the lowering of the load at a uniform rate but as such braking means forms no part of my present invention, I have not illustrated the same herein.

For handling relatively heavy loads such as burial vaults and vault parts, I provide chains 39 and chain pulleys or sheaves 40 splined to the square shafts 30 for longitudinal adjustment for loads of various lengths. The outer ends of the chains are provided with load engaging hooks 41. In Fig. 1, the hooks are shown engaged with eyes 42 of the load 43 such as the bottom of a burial vault. The length of the chains 39 may be readily adjusted by merely lifting them from engagement with the sheaves 40 and then re-engaging them with the sheaves which are conformed to receiver the links of the chain. As illustrated by Fig. 5, when the chains are retracted they are substantially out of sight and rest on the lower member of the side frames 3. The shafts 30 are connected at one end of the frame by the cross shaft 44 which terminates at one end in a crank receiving portion 45 for controlling the chain sheaves. As illustrated by Fig. 7, the cross shaft 44 is provided with a worm gear 46 which meshes with the gear wheel 47 on the side shafts 30, the gears being disposed in the bearing housing 48. As illustrated by Fig. 8, the cross shaft 44 is also provided with a gear 49 which meshes with the pinion 50, the shaft 51 of which terminates in a crank receiving portion 52. Thus, when extremely heavy loads are to be handled by the chains, the pinion 51 is used, while for lighter loads such as vault parts the crank is applied directly to the shaft 44.

While the belt sheaves or reels 28 and the chain sheaves or pulleys 40 are both supported by the square shafts 30 and are splined thereto for longitudinal adjustment, nevertheless the strap control and the chain control are entirely separate and independent so that light and heavy loads may be handled individually. The axis of the pulleys is the same. Thus, the straps or chains may be used in cooperation with the collapsible supports at the top of the frame.

While this machine is primarily designed and intended for use as a burial apparatus, it can be applied to the lifting and transporting and lowering of loads in general. It is an under lifting portable elevator capable of lifting a load from underneath itself and discharging the load overhead above itself. For instance, a rough box containing a casket is setting on the ground level and it is desired to remove the casket and rough box separately to a vehicle or platform above the level of the ground. In this case, the machine is tilted as illustrated by Fig. 9 and advanced so as to straddle and encompass the rough box. The straps are then placed under the ends of the casket, attached to the sheaves or reels and the spindles are rotated to elevate the casket. When the casket is raised above the level of the supports they are advanced to supporting position and the spindles rotated so as to release the casket which rests upon the rollers whereupon the casket is transported to the desired station and rolled from the supports onto the vehicle or platform as desired. The straps are then placed under the box which is handled in the same manner.

Reversing this operation, it is desired to place a casket in a rough box and load both casket and box into a vehicle or on a platform. In this case, the box is rolled upon the machine and the spindles are rotated so that the straps lift the box above the level of the rollers which are thereupon collapsed alongside of the frame, the box being lowered to the floor. The rollers are again swung out and the casket is rolled thereon. The spindles are thereupon rotated so as to elevate the casket above the rollers which are retracted and the casket is lowered into the box. The box with the casket in it may be placed upon a vehicle or platform by arranging the straps under the box and elevating the combined load through the opening formed by the frame above the level of the rollers which are swung into supporting position prior to the releasing of the load by the straps. In this position, the load may be rolled from the top of the machine onto the platform or other vehicle.

The machine may be used for a complete burial service; that is, picking up the heavy burial vault, transporting it to the cemetery, lowering the bottom half of the vault into the grave. After the bottom half of the vault has been lowered, the machine is left in place over the grave and is used as a casket lowering device for the funeral service and for subsequently picking up and lowering the top half or cover of the vault in the grave. The double elevating means provided by the chains and straps permits of a vault or box being suspended by the chains and the lowering of the casket into the vault or box by the straps and subsequently the raising of the vault or box above the level of the machine, permitting sealing of the vault or box above the surface of the ground and then lowering the sealed vault with the casket therein.

Referring to Fig. 1, there is illustrated a vault 53 being lowered into the grave 54 by means of the chains 39, the parts being illustrated by dotted lines. Side timbers 55 are used for supporting the wheels 7 at opposite sides of the grave to prevent the latter from caving in the walls of the grave. During the burial service, the apparatus is draped with suitable material which conceals its parts.

Fig. 9 shows the vehicle tilted so as to be moved to encompass the vault 53 illustrated by dotted lines. Heretofore, it has been necessary to disjoin or split the frame of the vault handling apparatus in order to encompass a load higher than itself. This expensive procedure is entirely eliminated by my arrangement of the side frames of the vehicle which permits the tilting of the body for the purpose set forth.

Figure 10:
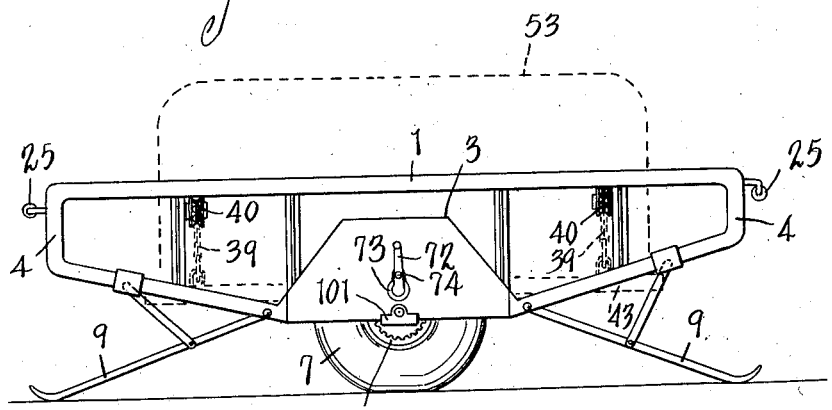
Fig. 10 is a view in side elevation showing the load encompassed and partially elevated.

Fig. 10 shows the casket 53 partially elevated and ready for transportation by the vehicle. The legs 8 are shown in extended position and it is to be understood that when used as a trailer the legs are retracted.

Figure 11:
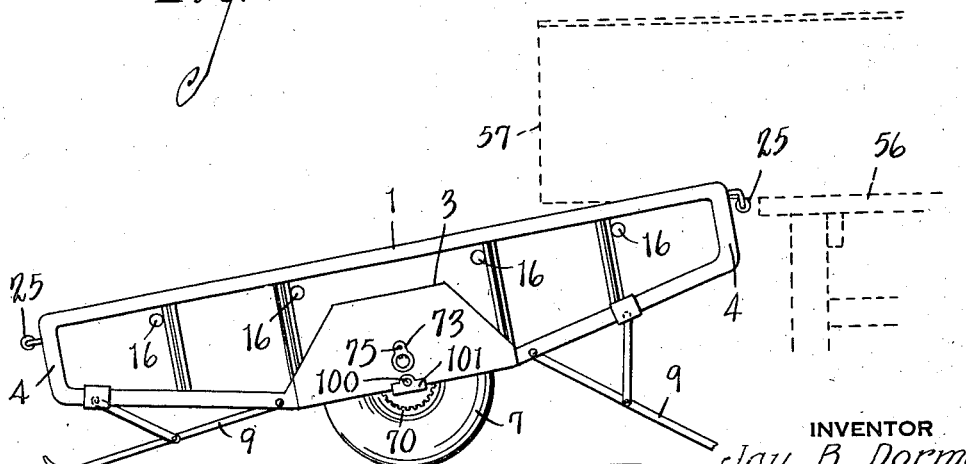
Fig. 11 is a side elevation showing the vehicle in tilted position for receiving the load from a plaform or level higher than itself.

Fig. 11 illustrates the body of the vehicle in inclined position for coaction with the raised platform 56 in depositing or receiving the load 57, in this case, a casket box, the load and platform being illustrated by dotted lines. The body of the vehicle is supported in inclined position by the legs 9 which are arranged to engage the surface of the ground.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. In a truck or vehicle, the combination of an open frame-like body, supports pivotally mounted on opposite sides of the body for swinging movement from a collapsed position parallel to the side members of the body to a position transversely of the body under a load, and rollers on said supports facilitating manipulation of the load thereon and of the supports relative to the load.

2. In a device of the class described, the combination of a frame, supports pivoted to opposite sides of the frame for swinging movement in a common horizontal plane between a position normal to the sides of the frame and a position adjacent the sides of the frame, load carrying rollers on said supports, and a control for actuating said supports in unison.

3. In a device of the class described, the combination of a frame, supports pivoted to opposite sides of the frame for swinging movement in a common horizontal plane between a position normal to the sides of the frame and a position adjacent the sides of the frame, and a control for actuating said supports in unison.

4. A device of the class described having in combination an open frame, horizontally swinging supports pivoted to opposite sides of the frame for carrying a load above the frame opening, and means for actuating said supports to collapsed position to release said load.

5. In a device of the class described, the combination of a frame, supports pivoted to opposite sides of the frame for swinging movement in a common plane between a position normal to the sides of the frame and a position adjacent the sides of the frame, and a control for actuating said supports in unison.

6. In a device of the class described, the combination of a frame having spaced side members and open between the side members, spaced rollers pivoted to said side members to swing in the plane of the frame from a position in line with said side members to a position at right angles thereto within the frame, and means for swinging said rollers in unison comprising longitudinal shafts, screws on said shafts, cranks on said rollers, traveling nuts associated with said screws, links connecting said nuts to said cranks, a cross shaft geared to said longitudinal shafts, said nuts and screws being arranged to swing adjacent ones of said rollers in opposite directions.

7. In a device of the class described, the combination of a frame having spaced side members and open between the side members, spaced rollers pivoted to said side members to swing in the plane of the frame from a position in line with said side members to a position at right angles thereto within the frame, and means for swinging said rollers in unison.

8. In a device of the class described, the combination of spaced rollers pivoted to swing in a common plane, and means for swinging said rollers in unison comprising longitudinal shafts, screws on said shafts, cranks on said rollers, traveling nuts associated with said screws, links connecting said nuts to said cranks, and a cross chain geared to said longitudinal shafts, said nuts and screws being arranged to swing adjacent ones of said rollers in opposite directions.

9. In a device of the class described, the combination of a substantially rectangular frame, spaced load supports pivoted to opposite sides of the frame for swinging movement in a common plane parallel to the plane of the frame, cranks on said supports, driving shafts on opposite sides of the frame, worm screws on said shafts, traveling nuts associated with said worm screws, links connecting said nuts to said cranks, and an end cross chain connecting said driving shafts, said traveling nuts and worm screws being arranged to swing adjacent ones of said supports in opposite directions.

10. In a device of the class described, the combination of spaced load supports pivoted for swinging movement in a common plane, cranks on said supports, driving shafts on opposite sides of the frame, worm screws on said shafts, traveling nuts associated with said worm screws, links connecting said nuts to said cranks, and an end cross chain connecting said driving shafts.

11. In a device of the class described, the combination of a frame, rollers pivoted to opposite sides of the frame for swinging movement parallel to the plane of the frame, actuators in driving connection with said rollers for moving the same between a position normal to the sides of the frame and a position alongside of the sides of the frame, and a unitary control for said actuators whereby said rollers are moved in unison.

12. In a device of the class described, the combination of a frame, load supports pivoted to opposite sides of the frame for swinging movement in a common plane, actuators for collapsing said supports alongside of the opposite sides of the frame, and a unitary control for said actuators.

JAY B. DORMER.